Nov. 25, 1930.  C. DIETRICHS  1,782,412
CONCRETE PIPE MOLD
Filed April 23, 1926   4 Sheets-Sheet 1

Fig.1.

INVENTOR
Charles Dietrichs
BY
Pennie, Davis, Marvin & Edmonds
ATTORNEYS

Nov. 25, 1930.  C. DIETRICHS  1,782,412
CONCRETE PIPE MOLD
Filed April 23, 1926   4 Sheets-Sheet 3

Patented Nov. 25, 1930

1,782,412

UNITED STATES PATENT OFFICE

CHARLES DIETRICHS, OF LITTLE FERRY, NEW JERSEY, ASSIGNOR TO WALKER CEMENT PRODUCTS, INC., OF UNION CITY, NEW JERSEY, A CORPORATION OF NEW JERSEY

CONCRETE-PIPE MOLD

Application filed April 23, 1926. Serial No. 104,046.

This invention concerns plastic molding in general, and relates to the molding of porous cement pipes in particular.

Porous cement pipes for drainage purposes have been on the market for some years. Such pipes are composed of cement and small crushed stone but without sand and with the cement in such proportion to the crushed stone as not to completely fill the voids in the stone. Such pipe, of course, has not the tensile strength of pipe made of a properly proportioned cement formula, but is exceedingly porous and has found favor as a substitute for perforated drain pipe, although of greater cost due to the fragile nature of the cement pipe which has heretofore necessitated the manufacture of the pipe by hand.

The principal object of this invention is to provide an apparatus for quantity production of molded pipes of the type above described which is capable of continuous, uninterrupted use, and which is automatic or semi-automatic.

A further object of the present invention is to provide a molding machine in which the plastic composition in the molds is agglomerated or made more or less compact by other means than by tamping or ramming, in order to maintain the extraordinary porosity of the special composition which can be used in this machine.

A still further object of the present invention is to provide a machine of this class whereby the pipes, from their formation to their completely dried and set condition, are never touched by hand or subjected to unbalanced forces, so that danger of breakage is obviated.

My invention also includes improvements in the pipe itself whereby a greater tensile strength and a more uniform structure are obtained without sacrificing the porosity.

A still further object of the present invention is to generally improve this class of apparatus by increasing its productivity, efficiency, durability, and economy.

The scope of this invention also contemplates the use of this machine in molding any kind of plastic, but it is to be understood that this machine is particularly adapted for the production of the present kind of pipe.

Further objects and advantages will appear in the following description.

With this and other objects in view, the invention consists in certain novel and useful elements and the structure and combination of these elements, as hereinafter fully described.

In the accompanying drawings forming a part of this specification, is disclosed one embodiment of the present invention, but it is to be understood that the invention is not limited thereby to the particular structure there shown, except insofar as defined in the appended claims.

In these drawings.

Referring now to the drawings more in detail, the apparatus comprises a frame 1, composed of vertically and horizontally disposed members, for supporting the operating mechanism.

The molding matrices 3, here shown as six in number, are supported by the mold-frame or structure 3', and each matrix comprises two similar semi-cylindrical halves, the left half 9 (see Fig. 7) being rigidly secured to frame 3', by rivets or other suitable means, and the right half 10, being a detached, removable, semi-cylindrical member of sheet iron or other sheet metal, which serves as a tray or carrier for the completely molded but still plastic pipes in later steps in the process, as will be more fully explained hereinafter.

Coacting with the molding matrices to mold the pipes or other objects, are a number of cores 5, here shown as six, attached rigidly to a core-frame 4, which frame is disposed vertically beneath the matrices, and is adapted to be raised and lowered by power transmitted by the shaft 27—the power being here shown as applied by hand to a handwheel 16—said shaft 27 acting, through the pinions 19, on the racks 20, whereby the core-frame 4 carrying the cores 5 is vertically raised or lowered in the slide-ways 17, formed integral with the frame 1. The frame and cores are held in the raised position by the latches 13, carried on the shaft 31, mounted in bearings 33, supported by a transverse member 32 of the main frame, and operated by the lever 14, which is controlled by a spring 15.

Figure 1:
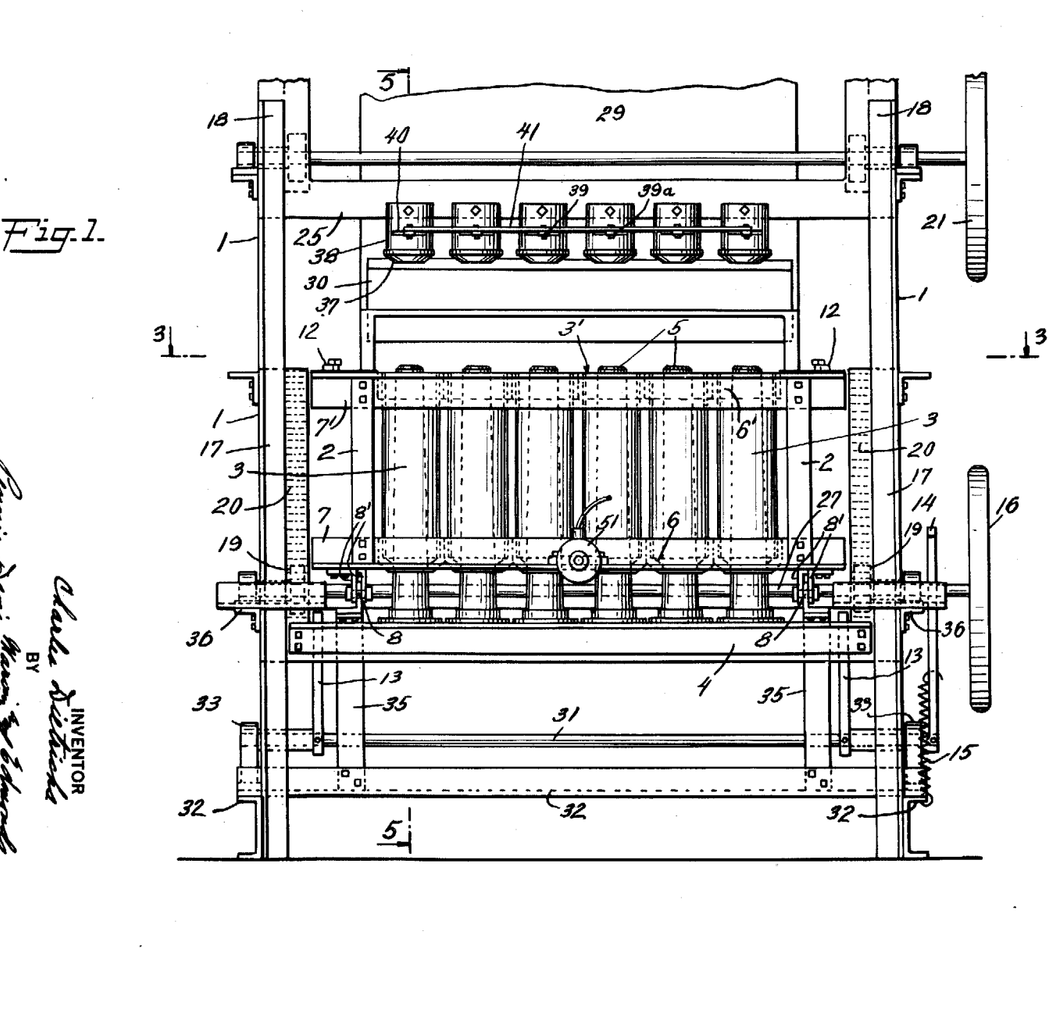
Figure 1 is a front elevation of the machine of the present invention.

The entire mold-structure is rotatable in a vertical plane through approximately 90° from the vertical to the horizontal, about the pivots 8 at each end of the machine. These pivots are mounted on the mold-structure supporting verticals 35 (see Fig. 1).

The mold frame is composed of two lower angle irons 7 and two upper angles 7' each of which is rigidly attached to the corresponding lower angle by vertical bars 2 near each end of the angle. The two frame parts thus formed are separately hinged on the pivot 8 by lever arms 8' whereby the frame as a whole may be turned on the pivots or the two halves may be separately turned. When in its approximately horizontal position, the mold structure is held up by the extensions 36 of the frame 1 in such a manner that the two halves of the mold frame may be swung apart and the completely molded pipes 52 can be removed in their carriers 10; that is, the detached, removable, semi-cylindrical halves of the mold matrices.

Each molding matrix is constructed of a lower casting in the form of a semi-circular cup 6 which shapes the bottom ends of the pipes. This cup is divided in halves on a line radial to the axis of rotation of the mold frame, and the two halves are rigidly secured to the angles 7 of the mold-frame 2 by any suitable means. The upper part of the matrix comprises a similar divided collar 6'. To these elements are attached the semi-cylindrical matrix halves. The collar is of course divided along the same line as the other parts, and the cups and collars are rigidly connected to the mold frame angles 7, 7' by welding, rivets or otherwise.

Figures 6, 7:
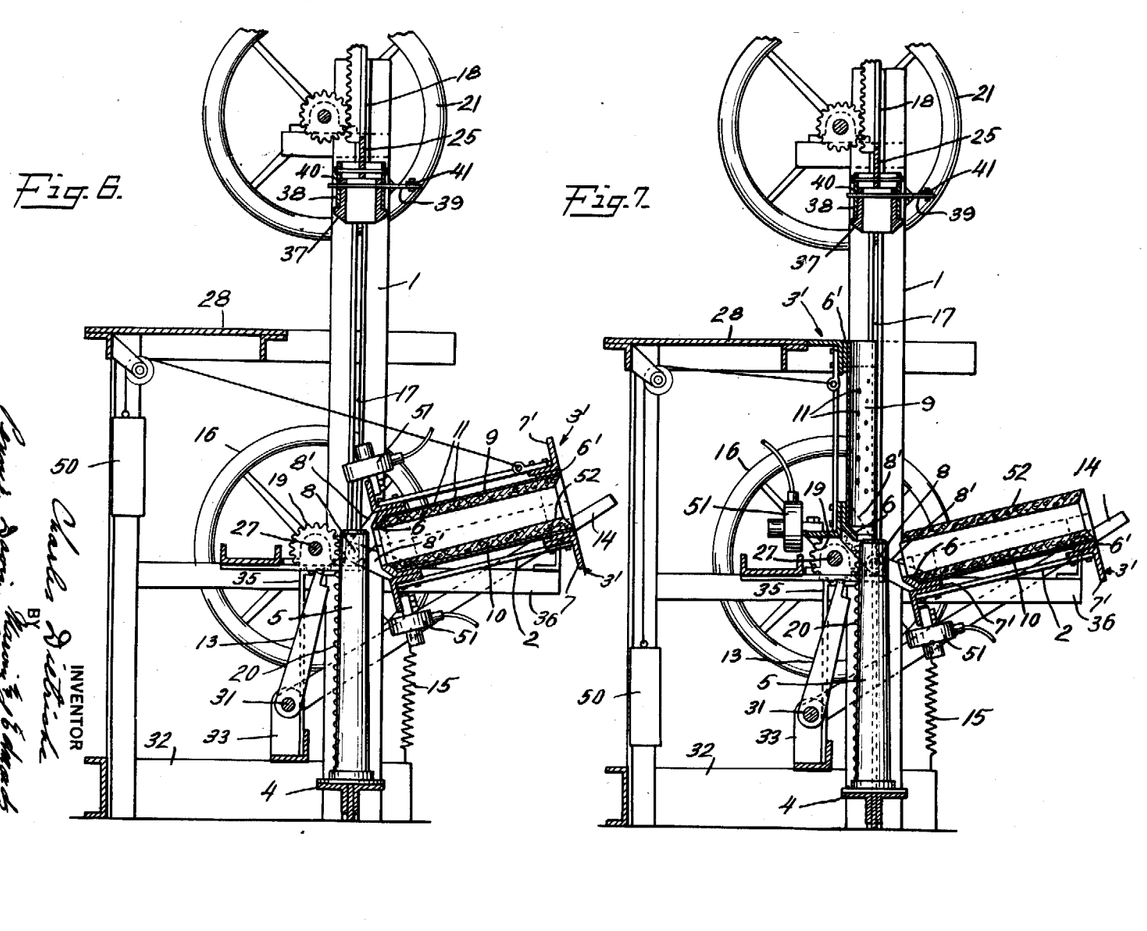
Fig. 6 is a transverse sectional view of the machine along line 5—5 of Fig. 1, sighting in the direction of the arrows, but omitting the hopper structure of Fig. 5, and showing the battery of the molds tipped over on their sides after loading and compacting the composition therein.
Fig. 7 is a transverse sectional view of the machine along line 5—5 of Fig. 1 sighting in the direction of the arrows, and differing from Fig. 6 by showing the left-hand, fixed halves of the molds returned to their loading position, leaving the right-hand, removable halves of the molds supported by the frame, and exposing the upper sides of the mold pipes.

The halves 9 are rigidly secured to the corresponding half-section of the cups and collars at top and bottom, and therefore to frame channels 7, by spot-welding, riveting or in any other suitable fashion. The entire surfaces of the halves 9 are perforated with apertures 11 of a size sufficient to allow air to enter freely between the surface of the pipe and the mold, so that there is no tendency for the pipes to stick to the upper halves when the two halves of the mold are separated as shown in Fig. 7. The apertures are of course small enough so as not to cause protuberances on the surfaces of the finished pipes. The halves 10 of the mold are loose, so that when the mold is open, the parts 10 may be removed with the pipes, and duplicated parts 10 may be substituted to prepare the mold for the next operation. In this way the molded pipes may be laid out to set in the half-mold sections 10, and thus handling is avoided until there is no longer danger of breakage.

Figures 2, 3, 4:
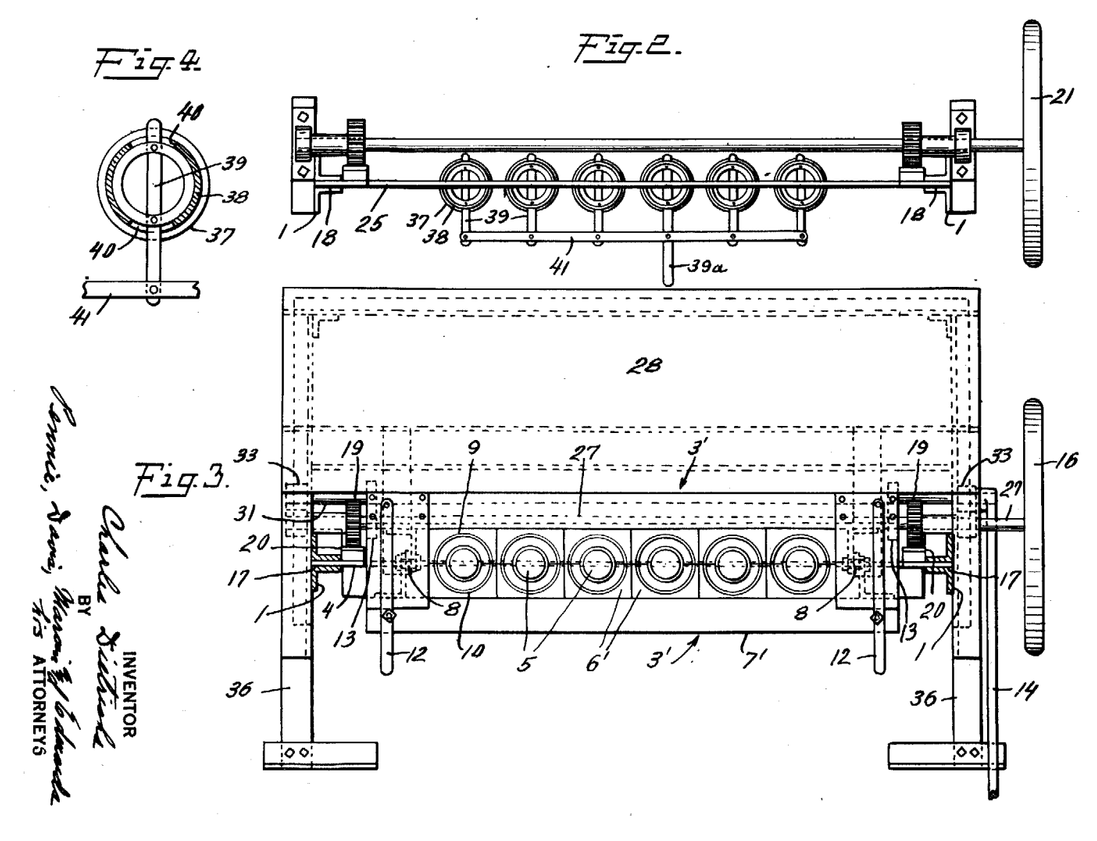
Fig. 2 is a detail plan view of the device for finishing the tops of the pipes.
Fig. 3 is a plan view, partly in section, along line 3—3 of Fig. 1, sighting in the direction of the arrows.
Fig. 4 is a sectional view on line 4—4 of Fig. 5 of one of the six identical elements of Fig. 2, showing the details of their construction.

The top of the mold is provided with locking latches 12, as shown in Fig. 3, for holding the two half sections of the mold structure together while the mold is being filled and the composition therein is being settled, and until the mold structure is lowered to its approximately horizontal position as shown in Figs. 6 and 7.

In order to shape the top ends of the pipes there is provided a frame 25 composed of vertically and horizontally extending members, the frame being vertically reciprocable in slide-ways 18 integral with the frame 1 and therefore in alignment with the mold-frame 2 and the core-frame 4 and with the rest of the machine. This frame 25 carries a series of dies for shaping the upper ends of the pipe to form a concave seat corresponding to the convex lower end of the pipe whereby when the pipes are laid they will be interlocking, as shown in Fig. 9.

Figures 5, 8, 9, 10, 11:
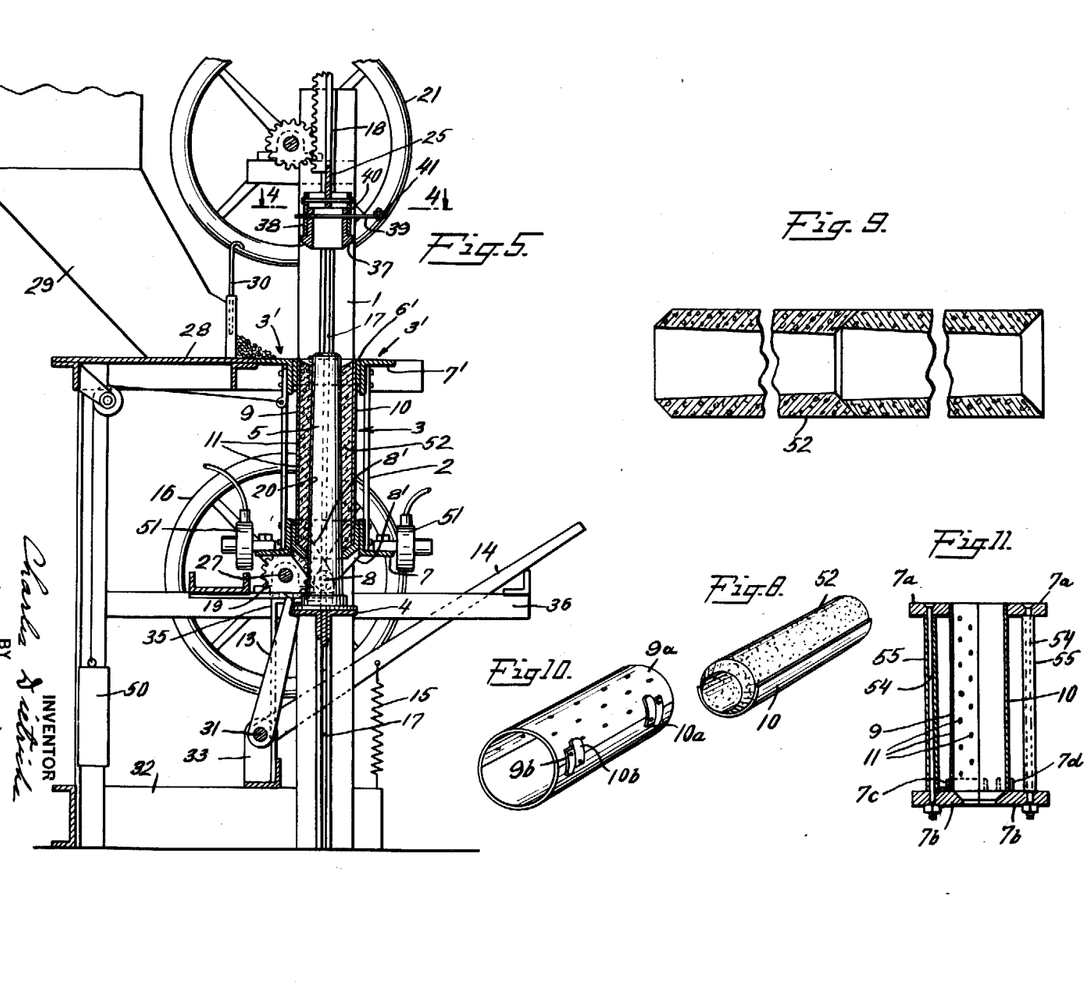
Fig. 5 is a transverse, sectional view of the machine along line 5—5 of Fig. 1, sighting in the direction of the arrows, and showing the mold-structure in its loading position, with the cores raised to their functioning position.
Fig. 8 is a perspective view of a pipe made by the machine of the present invention in place in its carrier tray, which tray is one of the right-hand, removable, semi-cylindrical halves of the molds shown in Fig. 7.
Fig. 9 is a fragmentary, sectional view of two pipes produced by the machine of the present invention, showing the method of fitting the pipes together to utilize the countersunk, or concave upper ends, and the convexly molded lower ends.
Fig. 10 is a detail view showing a modified form of mold in which both halves of the mold are detachable.
Fig. 11 is a detail view of a modified form of mold frame designed to somewhat cheapen the cost of building the machine.

The top smoothing die structure is illustrated in Figs. 2, 4 and 5. Each die comprises an annular member 37 having a convex lower face corresponding to the shape which it is desired to impart to the end of the pipe. The part 37 is mounted for oscillation in a sleeve 38 fast to the transverse member of the frame 25, as shown in Fig. 5. Each part 37 is oscillated through a limited arc by means of levers 39 extending through slots 40 in the walls of the sleeve 38 and fixedly attached to the part 37. The projecting ends of the levers 39 are fastened together by means of a connecting bar 41 and one of the levers 39 is extended beyond the bar to form a handle 39$^a$ by means of which all the dies 37 are oscillated in unison.

The tilting mold frame is preferably provided with a counterweight 50 as shown in Fig. 5, which normally holds the frame in upright position and each of the lower angle bars 7 of the frame is provided with electric vibrators or agitators 51 of the kind commonly employed for agitating mechanical sieves and analogous devices. The construction of these agitators is not shown as it forms no part of the invention, but it will be understood that they are provided with an ordinary electric switch whereby they may be turned on and off by the operator, as desired.

The cores 5 are elevated to their proper position within the molds by means of the hand-wheel 16, thus completely closing the bottoms of the molds but leaving the tops open for the introduction of the plastic.

The operation of the machine is briefly as follows: A batch of the plastic of the preferred composition is fed down the chute or hopper 29, past the open shutter 30, and onto the loading or filling table 28, and thence scraped into the mold. The two halves of the mold are held together by the latch 12, and the mold structure is held in an upright position during the filling operation by the counterweights 50, and by the cores 5 which are locked in position by the latches 13.

The electric vibrators 51, of which there is one bolted to each side of the mold at the bottom on the flanged ring 7 on the frame 2, are set in operation during the filling and accomplish the compacting and settling of the plastic in the molds to a degree sufficient to insure durability and strength, but leaving the pipes exceedingly porous and absorptive. The mold is filled flush with the surface of the table 28 and the hand wheel 21 is then operated to lower the top concaving molds or dies against the composition in the molding matrices 3 to compress the material at the top sufficiently to thereby shape the end of the pipes. The lever 39 is then operated to oscillate the dies to smooth the concave tops of the pipes and prevent the composition adhering to the dies when they are raised. After the dies are raised, the lever 14 is released to unlock the core-frame, and the hand-wheel 16 is then operated to lower the core-supporting frame whereby the cores are retracted from the molds. The entire mold structure is then tilted over to the right on the pivots 8, as shown in Figs. 5, 6 and 7, and comes to rest on the supports 36. The upper halves of the matrices are then revolved back into a vertical position and are held there by the action of counterweights 50 of which there is one at each end of the mold frame. The completed pipes, the material thereof being still plastic, may then be removed from the machine resting on their sides in the carriers 10, and may be stacked for drying in this condition and thus handling is avoided until there is no longer any danger of breakage.

Instead of fastening one half of the sheet metal mold to the mold frame I may employ a mold having both sides detachable whereby the pipe is completely encased in the mold when it is removed from the machine. I have shown such a mold in Fig. 10. It is composed of two sections 9$^a$ and 10$^a$ similar to the sections 9 and 10 but preferably provided with lugs 9$^b$ and 10$^b$, respectively, on the sides for holding the two halves in engagement. The lugs 10$^b$ lie just within the lugs 9$^b$ to hold the two parts against longitudinal displacement and the lugs are formed of spring metal and curved to the contour of the mold to hold the two parts lightly against accidental separation but to permit them to be readily pulled apart when it is desired to remove the pipe.

In Fig. 11 I have disclosed a modification of the mold structure which has some mechanical advantages. As here shown the horizontal members of the mold frame are formed of plates instead of angles, the plates 7$^a$ at the top being provided with semi-circular recesses along their meeting edges to receive the sheet metal mold members 9 and 10, the member 9 of which is spot-welded or otherwise fixedly secured in place. The plates 7$^b$ at the bottom of the frame have semi-circular tapered recesses corresponding to the shape of the cup 6. The mold member 9 is fixedly secured to its plate by means of a collar 7$^c$ of angular cross section welded, respectively, to the plate and the mold member, and the mold member 10 is supported in place by a series of pins 7$^d$ surrounding the recess in the plate.

The upper and lower halves 7$^a$ and 7$^b$ of the mold frame are fastened together and maintained in spaced relation by tie-bolts 54 working through sleeves or tubes 55 whereby each half of the mold frame forms a unitary rigid structure.

The modified form of mold shown in Fig. 10 may obviously be used in conjunction with the mold frame of Fig. 11 as readily as with the frame construction shown in the other figures.

The cement composition heretofore employed for porous pipes may be used in my machine if desired, but I find that better results are obtained by a composition composed of one part cement, one part sand, six parts crushed stone and two parts cocoanut fibre. The pipe formed of this composition is quite as porous as the pipe formed of the crushed stone and cement mixture and has considerably greater strength, not only while the cement is wet, which facilitates handling the pipe during construction, but also after the cement is set, so that there is less breakage in shipping and handling. The pipe of my improved composition may be satisfactorily produced in a machine having one half of the molds fixed to the mold frame, but for the composition made without the sand and fibre it 's desirable to use the double mold shown in Fig. 10 so that the pipe will be completely protected until it has had an opportunity to set.

The mold of Fig. 10 may be used with advantage with the other composition also as it permits the pipes to be stacked up one on top of the other while setting, and may otherwise be handled with less care than the pipe supported in a half mold only.

I claim:

1. In a machine for molding a friable plastic material in a comparatively dry condition, a molding form comprising sections separable from one another to allow the molded material to be removed therefrom, one of said sections being perforated throughout substantially its entire surface so as to prevent portions of the molded material from adhering thereto when said section is removed from contact with the material while the material is still plastic.

2. In a machine for molding plastic material, a frame, an elongated molding form supported therein, and a die movable longitudinally with respect to the molding form and into the end of the form a predetermined relatively short distance to compress the material therein a predetermined relatively small amount, and means to rotate said die in a transverse plane to shape the end of said molded material.

3. In a machine for molding a friable plastic material in a comparatively dry condition, a frame, an elongated molding form supported therein in a substantially vertical position so as to permit the plastic material to be fed into the form in a substantially continuous operation thus preventing relatively tight packing of the material, and a die movable longitudinally with respect to the molding form and into the end of the form a predetermined relatively short distance to compress the material therein a predetermined relatively small amount, means to rotate said die in a horizontal plane and to shape the end of said material.

4. A machine for molding a friable plastic material comprising a frame, a supply table carrying the molding material, a molding form comprising a pair of cooperating separable sections pivotally mounted in the frame by common pivoting means which supports said sections in a vertical position with the tops thereof adjacent the supply table to receive the molding material therefrom, a core for the molding form provided with a support for raising and lowering the core into and out of cooperative molding position with respect to the molding form, and a die movable in the vertical direction into and out of engagement with the material in the upper end of the molding form, said die being mounted for oscillation while in contact with the molding material to smooth the end surface thereof and shape the same, means to oscillate said die, the cooperating sections of said molding form being tiltable about their common pivoting means to a substantially horizontal position after the core has been withdrawn from the form, and in this position one of these sections being separable from the other so as to allow the completely molded but still plastic material to be removed from the machine.

5. In a machine for agglomerating porous pipes from a comparatively dry plastic material, means for forming the pipes, comprising a mold frame, a plurality of concave elongated mold halves carried by said frame, and a plurality of tapered cylindrical cores, arranged below said mold frame and movable vertically and rectilineally into and out of said molds, said molds and said cores cooperating to form a cylindrical pipe having a tapered bore, and means for agglomerating the pipe walls to the requisite degree of porosity comprising a plurality of vibrating instrumentalities, said instrumentalities being associated with said mold support and cooperating with said pipe forming means.

6. A machine for forming porous pipes from a comparatively dry plastic material, comprising a main frame, a molding frame, said frame being pivoted in the main frame, and supporting a plurality of divided hemicylindrical matrices, said matrices being normally held in a vertical position and certain of said matrices having their entire area perforated, vibrating means for agglomerating the plastic material into the requisite degree of porosity, a core frame beneath the matrices, a plurality of tapered cylindrical cores supported by said core frame, means for moving said cores into said matrices and retracting them vertically therefrom, means for shaping the upper ends of the partly molded pipes in the matrices, means for tilting the matrices to an approximately horizontal position, and means for returning the upper halves of the matrices to a position near the vertical to thereby allow the removal of the completely molded but still friable pipe in the lower horizontal matrices from the machine.

7. A machine for molding a friable plastic material comprising a frame, a source of molding material, a molding form comprising a pair of cooperating separable sections pivotally mounted in the frame by common pivoting means which supports said sections in a vertical position with the tops thereof adjacent said source to receive the molding material therefrom, a core for the molding form provided with a support for raising and lowering the core into and out of cooperative molding position with respect to the molding form, and a die movable in the vertical direction into and out of engagement with the material in the upper end of the molding form, said die being mounted to enter the mold form a predetermined distance and compress the molding material therein a predetermined amount, the cooperating sections of said molding form being tiltable about their common pivoting means to a substantially horizontal position after the core has been withdrawn from the form, and in this position one of these sections being separable from the other so as to allow the completely molded but still plastic material to be removed from the machine.

In testimony whereof I affix my signature.

CHARLES DIETRICHS.

for moving said cores into said matrices and retracting them vertically therefrom, means for shaping the upper ends of the partly molded pipes in the matrices, means for tilting the matrices to an approximately horizontal position, and means for returning the upper halves of the matrices to a position near the vertical to thereby allow the removal of the completely molded but still friable pipe in the lower horizontal matrices from the machine.

7. A machine for molding a friable plastic material comprising a frame, a source of molding material, a molding form comprising a pair of cooperating separable sections pivotally mounted in the frame by common pivoting means which supports said sections in a vertical position with the tops thereof adjacent said source to receive the molding material therefrom, a core for the molding form provided with a support for raising and lowering the core into and out of cooperative molding position with respect to the molding form, and a die movable in the vertical direction into and out of engagement with the material in the upper end of the molding form, said die being mounted to enter the mold form a predetermined distance and compress the molding material therein a predetermined amount, the cooperating sections of said molding form being tiltable about their common pivoting means to a substantially horizontal position after the core has been withdrawn from the form, and in this position one of these sections being separable from the other so as to allow the completely molded but still plastic material to be removed from the machine.

In testimony whereof I affix my signature.

CHARLES DIETRICHS.

CERTIFICATE OF CORRECTION.

Patent No. 1,782,412.      Granted November 25, 1930, to

CHARLES DIETRICHS.

It is hereby certified that error appears in the printed specification of the above numbered patent requiring correction as follows: Page 2, line 77, before the word "the" insert the word in, and line 111, for "duplicated" read duplicate; page 4, line 72, claim 3, strike out the word "and" and insert same before "means" in line 71, of same claim; and that the said Letters Patent should be read with these corrections therein that the same may conform to the record of the case in the Patent Office.

Signed and sealed this 6th day of January, A. D. 1931.

(Seal)                                M. J. Moore,
Acting Commissioner of Patents.

CERTIFICATE OF CORRECTION.

Patent No. 1,782,412.  Granted November 25, 1930, to

CHARLES DIETRICHS.

It is hereby certified that error appears in the printed specification of the above numbered patent requiring correction as follows: Page 2, line 77, before the word "the" insert the word in, and line 111, for "duplicated" read duplicate; page 4, line 72, claim 3, strike out the word "and" and insert same before "means" in line 71, of same claim; and that the said Letters Patent should be read with these corrections therein that the same may conform to the record of the case in the Patent Office.

Signed and sealed this 6th day of January, A. D. 1931.

(Seal)

M. J. Moore,
Acting Commissioner of Patents.